(12) United States Patent
Baumann et al.

(10) Patent No.: US 8,558,422 B2
(45) Date of Patent: Oct. 15, 2013

(54) UNIFORM CONTAINED COOLING FOR STATOR

(75) Inventors: Jonathan Baumann, Peoria, IL (US); Perry Cruce, Marquette Hts., IL (US)

(73) Assignee: Caterpillar Inc., Peoria, IL (US)

( * ) Notice: Subject to any disclaimer, the term of this patent is extended or adjusted under 35 U.S.C. 154(b) by 272 days.

(21) Appl. No.: 13/077,665

(22) Filed: Mar. 31, 2011

(65) Prior Publication Data

US 2012/0248904 A1 Oct. 4, 2012

(51) Int. Cl.
*H02K 9/00* (2006.01)
(52) U.S. Cl.
USPC .............................................. 310/54; 310/52
(58) Field of Classification Search
USPC ..................................................... 310/52–59
See application file for complete search history.

(56) References Cited

U.S. PATENT DOCUMENTS

| | | | |
|---|---|---|---|
| 3,995,181 A | 11/1976 | Suit | |
| 5,473,207 A | 12/1995 | Hopeck et al. | |
| 5,859,482 A | 1/1999 | Crowell et al. | |
| 5,979,087 A | 11/1999 | Bell et al. | |
| 6,700,283 B2 | 3/2004 | Kikuchi et al. | |
| 6,713,927 B2 | 3/2004 | Kikuchi et al. | |
| 6,787,948 B2 | 9/2004 | Peterson et al. | |
| 6,809,441 B2 | 10/2004 | Randall | |
| 6,809,442 B2 | 10/2004 | Kaneko et al. | |
| 2003/0173840 A1* | 9/2003 | Seniawski et al. | 310/54 |
| 2004/0012294 A1* | 1/2004 | Rippel et al. | 310/217 |
| 2005/0206258 A1* | 9/2005 | Gustafson et al. | 310/87 |
| 2006/0119196 A1* | 6/2006 | Konishi et al. | 310/64 |
| 2008/0061637 A1 | 3/2008 | Gamble et al. | |
| 2010/0239441 A1* | 9/2010 | Bade et al. | 417/410.1 |
| 2011/0215660 A1* | 9/2011 | Goto et al. | 310/53 |

* cited by examiner

*Primary Examiner* — Thanh Lam
(74) *Attorney, Agent, or Firm* — Leydig, Voit & Mayer (57) ABSTRACT

A liquid-cooled stator and rotor assembly for use as an electric motor or generator includes a housing having a first end bell, a second end bell, and at least one fluid orifice in the first end bell. A stator is fixed within a stator cavity of the housing. The stator includes a stator core and a plurality of windings for conducting a flow of electricity. A rotor for magnetically interacting with the stator is also included, the rotor being rotatably mounted between the first end bell and the second end bell within a rotor cavity. A first sealing ring and a second sealing ring are provided to form a fluid seal against the respective end bells and against a portion of the stator such that a cooling fluid entering the stator cavity via the orifice does not enter the rotor cavity.

17 Claims, 7 Drawing Sheets

*FIG. 7*

UNIFORM CONTAINED COOLING FOR STATOR

TECHNICAL FIELD

This patent disclosure relates generally to electric motors and generators, and more particularly to a method and system for efficiently cooling a stator in such devices.

BACKGROUND

In manufacturing, mining, construction, transportation, and other fields of endeavor, it is often necessary to convert stored energy into mechanical energy. While internal combustion (IC) engines remain a prominent means for meeting this end, electric motors are increasingly preferred for the benefits they provide relative to their IC counterparts. For example, electric motors tend to be much quieter and emit less pollution than equivalent IC engines. Moreover, the conversion of stored electrical energy to mechanical energy may be reversed, and the same basic system used to convert excess mechanical energy into stored electrical energy.

However, powerful electric motors and generators do require cooling in some situations, both to maintain efficiency and to avoid damage. An electric generator (as used herein, the term generator will refer generally to the described physical configuration, whether the device acts as a motor, generator, alternator, rotary converter, etc.) typically includes a stator, which is stationary, i.e., non-rotating, and a rotor, which rotates within the stator, separated by an air gap from the inner surface of the stator assembly. Some devices alternatively employ an "out runner" or "inside out" configuration, wherein the rotor is external to and surrounds the stator.

Regardless of the overall motor configuration, the stator generally comprises a core of ferromagnetic material and windings, consisting of coils of insulated wires or conductors, wound about pole pieces. The rotor may also include a core of ferromagnetic material. The construction of cores, e.g., from laminations or otherwise, and of windings and other physical aspects of traditional motors, while generally relevant, will not be discussed further herein as those of skill in the art will be familiar with traditional motor constructions.

In high-power systems, the substantial current densities and rapidly changing flux densities experienced by the stator can lead to excess heat generation in the stator. This excess heat can lead to inefficient operation, due, for example, to increased electrical impedance in the windings, as well as to damage to the windings or other components. To this end, generators intended for high-output (or high efficiency) may employ a mechanism for cooling the stator and dissipating excess heat. For example, a metal housing having fins may be adhered to or around the stator core, and the excess heat dissipated by a flow of air or fluid over the fins. Fluid cooling systems of certain other configurations have been tried as well.

The inventors have discovered that in practice there is non-uniform cooling when employing any of the prior cooling systems, in that hot spots and cool spots exist during operation. In this situation, even when the temperature at the point of application of the cooling means is well within bounds, the temperatures at other points in the system may be at or beyond a level where damage or substantial loss of efficiency set in. Thus, there is an unfilled need for a fluid cooling system capable of efficiently and uniformly cooling the stator in generator systems.

SUMMARY

In one aspect, the description illustrates and explains a liquid-cooled stator and rotor assembly for use as an electric motor or generator. The liquid-cooled stator and rotor assembly includes a housing having a first end bell, a second end bell, and at least one fluid orifice in the first end bell. A stator is fixed within a stator cavity of the housing. The stator includes a stator core and a plurality of windings for conducting a flow of electricity. A rotor for magnetically interacting with the stator is also included, the rotor being rotatably mounted between the first end bell and the second end bell within a rotor cavity. A first sealing ring and a second sealing ring are provided to form a fluid seal against the respective end bells and against a portion of the stator such that a cooling fluid entering the stator cavity via the orifice does not enter the rotor cavity.

In another aspect, an improved cooling electric motor is provided. The motor includes a motor housing and a stator assembly within the motor housing. The stator assembly includes a stator core and a plurality of windings. A rotor assembly is provided in a rotor cavity surrounded by the stator assembly. First and second sealing rings are provided, each sealing ring being positioned for sealing against the stator core and against the housing, thereby forming a stator cavity fluidly isolated from the rotor cavity. One or more orifices are provided into the stator cavity for flooding the stator cavity with a cooling fluid.

In yet a further aspect, a method of cooling an electrical motor/generator is provided. The motor/generator has a hollow cylindrical stator assembly and cylindrical rotor assembly within the hollow cylindrical stator assembly. The stator assembly further includes a plurality of conductive windings. Within this environment, the method includes fluidly isolating the plurality of conductive windings of the stator assembly from the rotor assembly and flooding the plurality of conductive windings with a cooling fluid without substantially introducing the cooling fluid to the rotor assembly.

Further and alternative aspects and features of the disclosed principles will be appreciated from the following detailed description and the accompanying drawings, of which:

DETAILED DESCRIPTION

This disclosure relates to generators, motors, alternators, and other devices having a stator wherein cooling is needed, e.g., to provide damage control, improved efficiency, and so on. A Switched Reluctance (SR) generator will sometimes be used herein as an example system, although as noted above, the described principles are much more widely applicable.

In overview, the inventors have observed that in a typical liquid-cooled motor/generator, the cooling fluid, typically oil, does not reach all points where cooling is required in order to properly cool the stator. The described principles involve flooding the stator, but not the rotor, to allow uniform cooling and eliminate "hot spots" in the stator. The described designs provide a seal between the stator and the rotor cavity to allow for cooling the stator while minimizing the amount of fluid interacting with and slowing the rotor.

Figure 1:
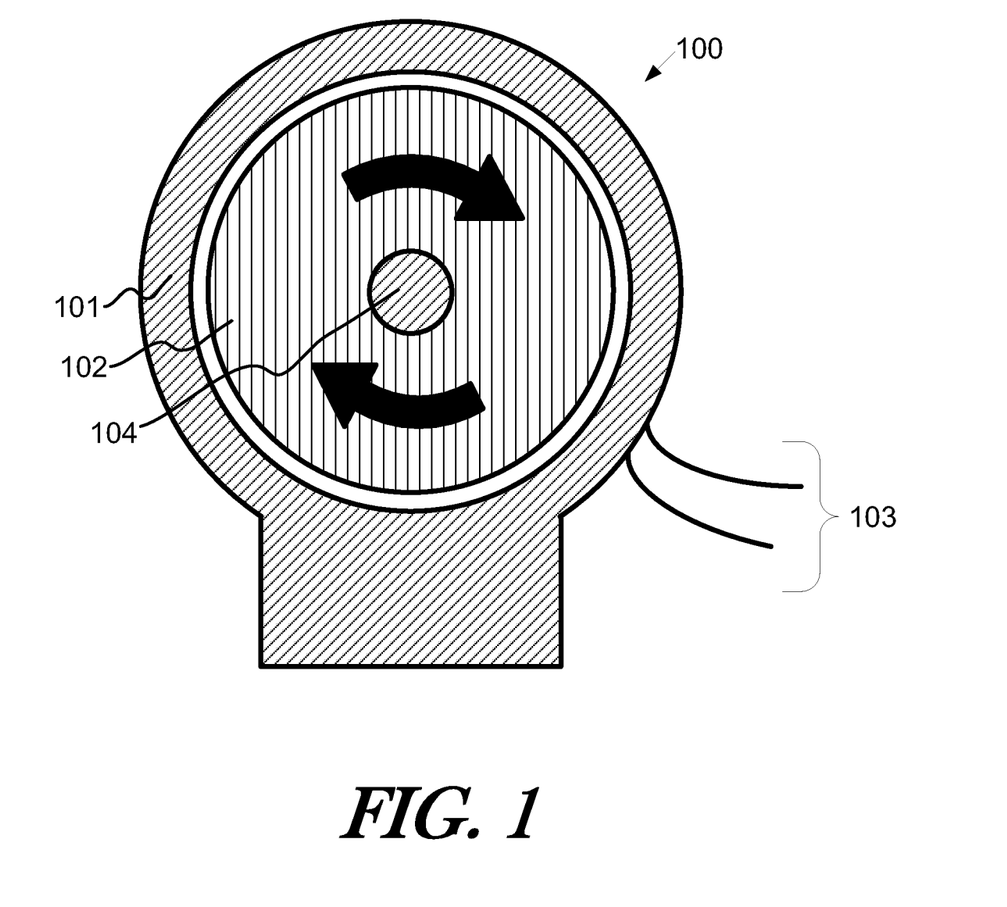
FIG. 1 is a simplified cross-sectional end view of a stator and rotor arrangement for use in a motor or generator in accordance with the disclosed principles.

Turning now to a more detailed description of the principles set forth herein, FIG. 1 is a simplified cross-sectional end view drawing of a stator and rotor arrangement 100, e.g., for use in a motor or generator. The stator 101 is a stationary component having a generally cylindrical interior cavity in which the rotor 102 is positioned. The rotor 102 is typically supported by one or more end bearings (not shown) to be rotatably held within the cavity of the stator 101. Depending on the exact configuration and use of the stator and rotor arrangement 100, there are typically two or more leads 103 to the stator 101. The leads 103 serve to supply or collect power from the device. The electrical energy collected or applied will typically be of an AC format, often of multiple phases. The waveform of the electrical energy depends upon the configuration and usage of the device.

In general, in a generator configuration, electrical energy is generated by the imposition of a varying magnetic field (e.g., via rotation) on a looped or wound conductor (not shown in this FIG.) to induce a current in the conductor. In a motor configuration, a time-varying voltage/current is applied to the stator 101, and in particular, to the windings therein, to create a time varying magnetic field which acts in the rotor 102 to induce a torque and to thus impart rotary motion.

The precise details of waveforms and voltage levels are not important to the described principles. Rather, the primary aspect of stator/rotor electrical power devices in various configurations and modes of operation is that the windings of the stator are subjected to rapidly varying currents and magnetic fluxes, resulting in the generation of substantial thermal energy, which appears in the system as waste heat. If this waste heat is allowed to build and is not dissipated, it may damage components of the system and may also increase the resistance of the conducting portions of the device such as the windings, causing efficiency to drop. Thus, it is desirable to remove the excess heat in a manner that eliminates isolated hot spots where damage can occur.

Although prior attempts have been made, as mentioned above, to cool the stator assembly via fluid cooling, these systems lacked the ability to uniformly cool the stator, and still left hot spots within the stator. For example, while it is possible to run tubes through the material of the stator, e.g., the stator core, this tends to cool the portions of the stator nearest to the tubes while providing only limited cooling to more remote portions. While air does not need to be contained as carefully, and it is possible to flood the stator with air to some degree, this still does not yield acceptable cooling, since the heat capacity of air is much lower than oil and most other fluids.

In an embodiment of the described principles, a liquid stator cooling system is provided wherein the liquid is flooded through the stator rather than passed through in contained conduits. In order to function without impeding the rotation of the rotor, a seal assembly is provided to isolate the stator internal space with the windings from the cylindrical inner cavity of the stator where the rotor resides.

Figure 2:
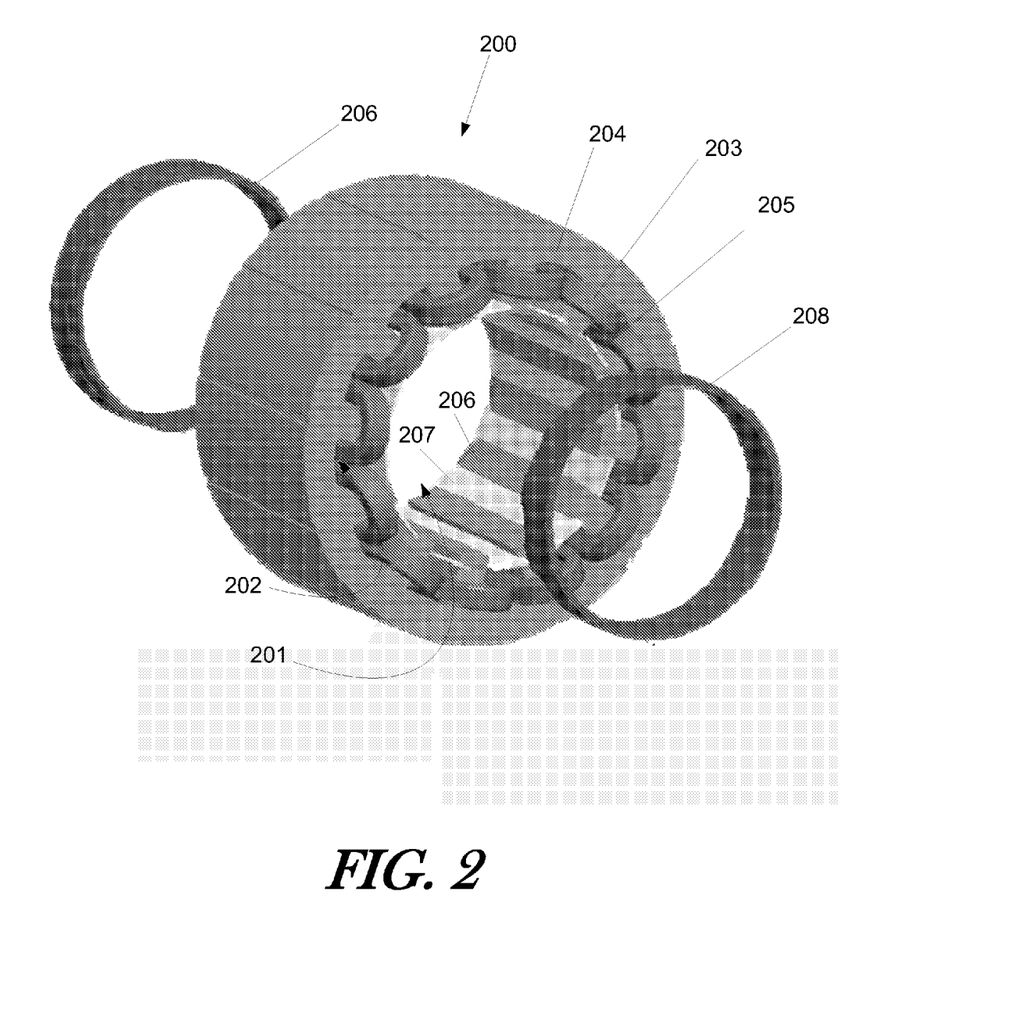
FIG. 2 illustrates a stator assembly in perspective view according to an embodiment wherein the stator inner cavity is sealed from the winding plenum in accordance with the disclosed principles.

Turning to FIG. 2, this figure illustrates a stator assembly 200 in perspective view, according to an embodiment wherein the stator inner cavity 201 is sealed from the winding plenum 202. The winding plenum 202 is comprised of a series of generally interconnected longitudinal cavities or spaces with a winding 203 being positioned within each such space or opening. There is typically space between the windings 203 and also between each winding and at least a portion of the stator core 204. The stator core 204 is a ferrous body for directing flux to or from the windings 203.

In order to seal the stator plenum 202 from the stator inner cavity 201, a series of spacers 205, sometimes referred to as "sticks," are inserted into receiving grooves in the stator core 204, such that the inner-facing surface of the stator cavity 201 is composed of inward-facing stator surfaces 206 of the stator core 204 as well as the inward facing spacer surfaces 207 of the spacers 205. Additionally, in an embodiment, an end ring 208 is provided to be affixed to each end of the stator assembly 200 in cooperation with the stator core 204 and the plurality of spacers 205 so as to seal the stator plenum 202 from the rotor cavity 201 (stator inner cavity) when a first end bell (not shown) is applied.

Figure 3:
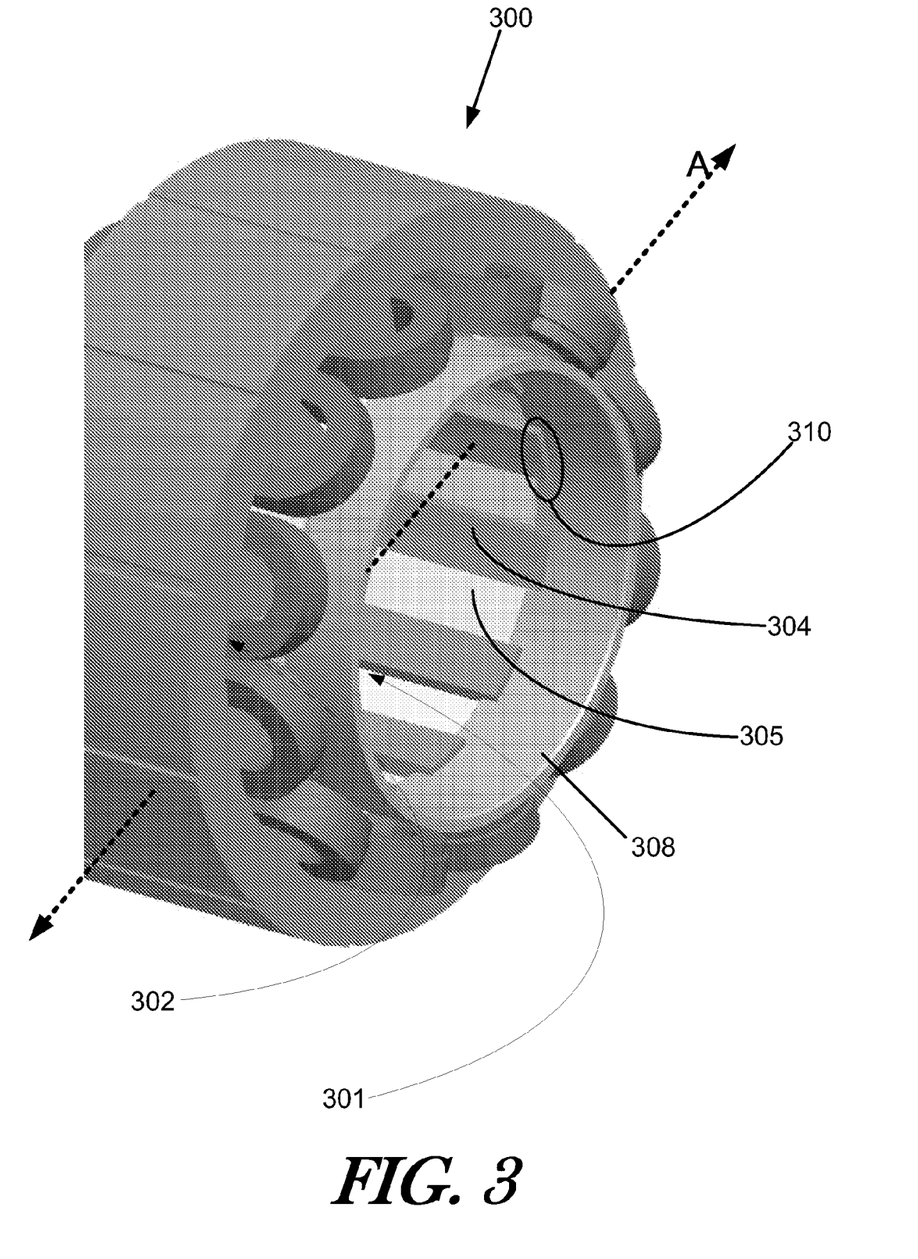
FIG. 3 is a partial perspective end view of a stator assembly in accordance with the disclosed principles.

Turning to FIG. 3, a partial perspective end view of the stator assembly 300 is shown. In the illustrated configuration, the end rings 308 (one visible) have been installed against the spacers 305 and the core 304. As can be seen in the figure, the stator core 304 includes a plurality of lips 310 that engage the inner surface of each end ring 308 to fix the location of the end ring 308 between the stator plenum 302 and the stator inner cavity 301. Likewise, in an embodiment, the end rings 308 include a depression, not clearly shown, for mating with the ends of the spacers 305. This depression is illustrated in greater detail in FIG. 4.

Figure 4:
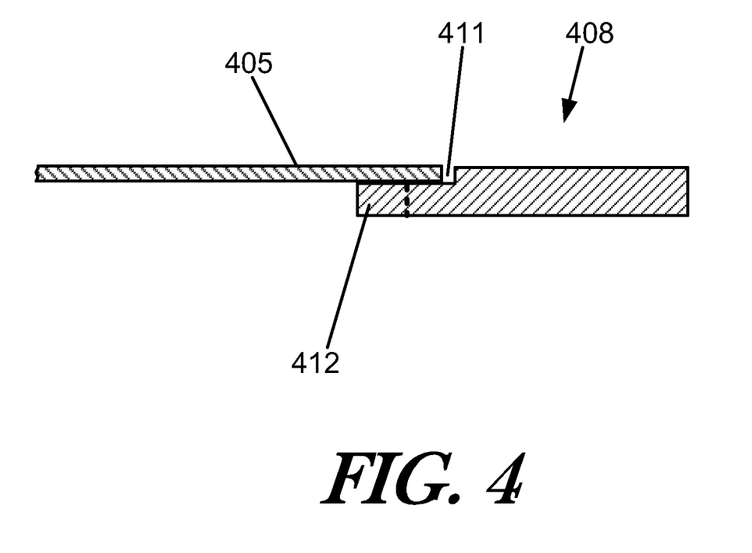
FIG. 4 is a cross-sectional side view of an end ring and a spacer taken along axis A of FIG. 3.

In particular, FIG. 4 is a cross-sectional side view of an end ring 408 and a spacer 405 taken along axis A of FIG. 3. At the point where the end ring 408 overlaps the spacer 405, the end ring 408 includes a depression 411 for receiving the end of the spacer 405. The depression 411 is formed both by an indentation of the ring 408 as well as by a tongue portion 412 that extends from the ring. A similar depression is included along the end ring 408 at each point where it mates with a spacer 405. This depression 411 acts to fix the angular position of the end ring 408 and also provides a greater sealing surface between each spacer 405 and the end ring 408. Note that the spacer 405 and end ring 408 are shown slightly displaced apart axially to allow the reader to view the depression 411. However, in practice the spacer 405 is preferably fully seated into the depression 411.

Figure 5:
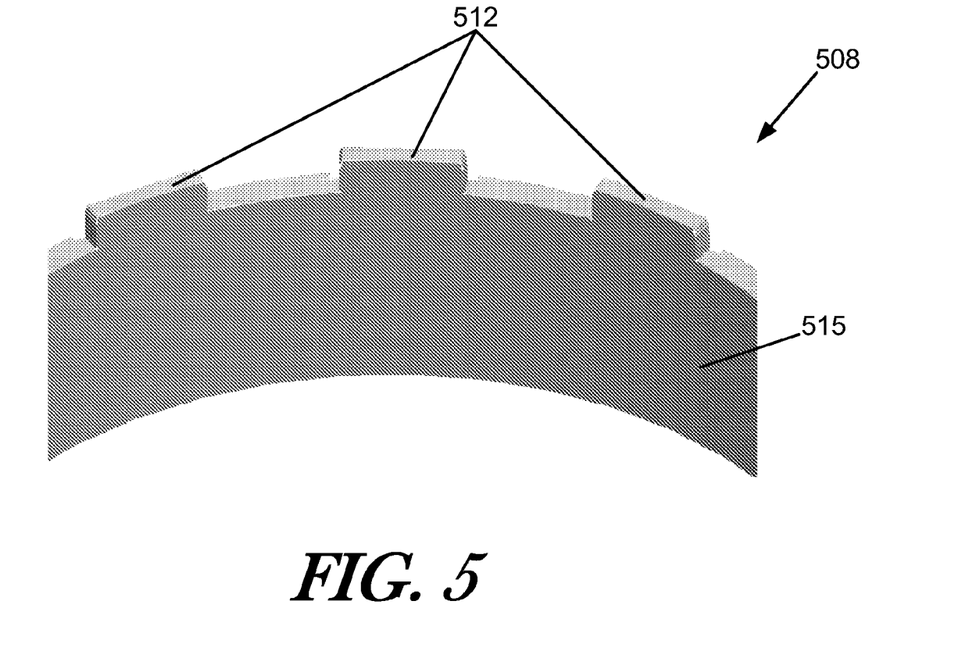
FIG. 5 is a partial perspective view of an inner surface of the end ring in accordance with an embodiment of the described principles.
Figure 6:
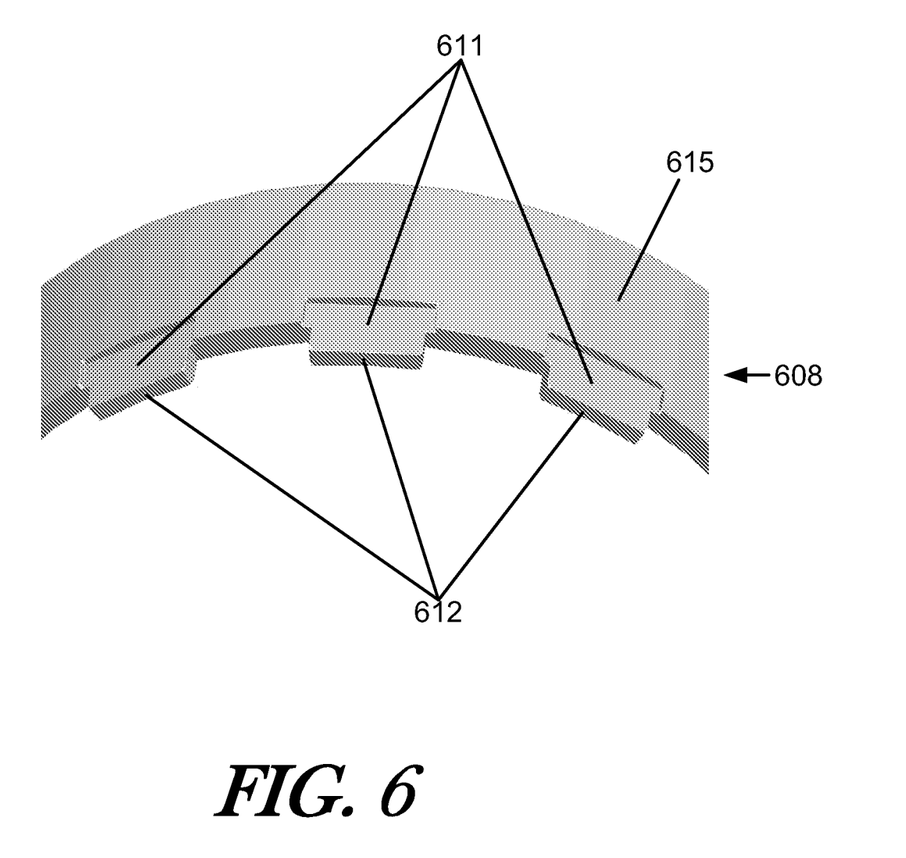
FIG. 6 is a partial perspective view of an outer surface of the end ring in accordance with an embodiment of the described principles.

The tongue portion 412 of the end ring 408 referred to in the discussion of FIG. 4 above may be more clearly seen in FIG. 5, which is a partial perspective view of the inner surface of the end ring 508. As can be seen, the end ring 508 comprises an annular main body 515 as well as the plurality of tongue portions 512 extending axially from the main body 515. FIG. 6 is a similar partial perspective view, but showing the outer rather than inner surface of end ring 608. The main body 615 and axially extending tongues 612 can again be seen. In addition, the indentions 611 for sealing against the ends of the spacers (not shown) can be seen along the back of each tongue 612 and partially into the main body 615.

The end rings 206-608 may be made of any material able to resist excessive degradation from the cooling fluid and able to withstand the mechanical forces and fluid pressures imposed by the environment at the stator. In an embodiment, the end rings 206-608 are made of Nylon, but a non-exhaustive list of other possible materials includes resins, plastics, aluminum and other metals, fiberglass, and so on. Typically, the rotor assembly will include two end rings, one at each end, and while the end rings will generally be the same, they are not necessarily interchangeable in every embodiment due to differences in the stator. The end rings may be a friction fit to the spacers and the stator core, or may be affixed thereto via one or more of glue, epoxy, mechanical fasteners, ultrasonic welding, etc.

Figure 7:
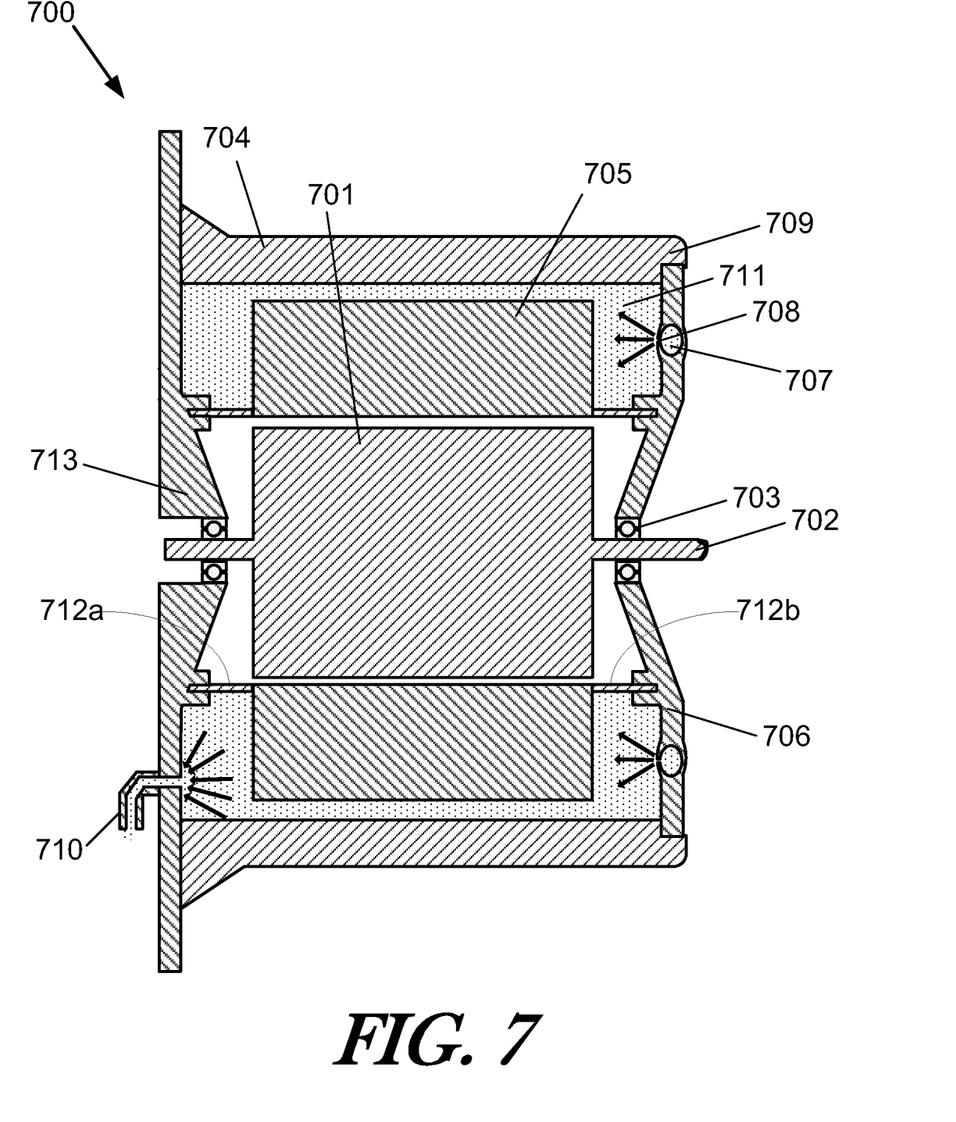
FIG. 7 is a simplified cross-sectional drawing showing a motor/generator in accordance with an embodiment of the described principles.

The simplified cross-sectional drawing of FIG. 7 shows a motor/generator 700 including an embodiment of the liquid cooling system described herein. In particular, the motor/generator 700 comprises a rotor 701 disposed on a shaft 702. The shaft 702 is rotatably supported on one or more bearings 703 within a housing 704. Portions of the housing will be discussed with respect to the cooling functions provided, but those of skill in the art will appreciate that the housing 704 will typically include other aspects, not shown here, for purposes of mounting, rigidity, electrical connectivity, and so on depending upon the end usage.

A stator 705 is fixedly supported within the housing 704. The rotor 701 is generally cylindrical, and the stator 705 is generally an elongated annulus with an inner cavity to accommodate the rotor 701. As noted above, the stator 705 comprises a core and one or more windings (not shown) that induce or react to a magnetic flux, depending on whether the device is used as a motor or generator.

The housing 704 includes a shell 709 and a first end bell 706 for supporting the shaft bearings 703. In an embodiment, the end bell 706 also comprises an annular ring passage 707 having an oil inlet (not shown) and a series of preferably evenly spaced oil injection nozzles 708 facing into the housing 704. Although only two nozzles 708 can be seen in the figure, any number of nozzles 708 may be used. For example, in an embodiment, one nozzle is provided next to each winding of the stator 705. The body of the housing 704 may comprise a second end bell 713.

An oil outlet 710 is provided in order to collect, cool, and reuse oil that has flowed through the cavity 711 around and through the stator 705. As described above, a spacer ring 712a is provided on a first end of the stator, and a spacer ring 712b is provided on the opposite end of the stator 705. In cooperation with the stator 705 core and the end bell 706, the end rings 712a, 712b serve to seal the cavity 711, including the stator 705, from the inner cavity containing the rotor 701. In this manner, oil can be introduced from the annular channel 707, through the nozzles 708, to flow the rough the cavity 711 for collection at the outlet 710, cooling the stator 705.

The temperature and flow rate of the cooling oil may be varied to affect the cooling rate and ambient temperature of the stator 705. Thus, for example, if the motor/generator 700 is under stress during high power consumption or generation activities, the cooling oil may be flowed more quickly and/or may be cooled more prior to entry into the cavity 711. In contrast, if the motor/generator 700 is operating at a lower power level, then little or no fluid cooling of the stator 705 may be required. In the simplest case, the oil may be drained or stagnated during periods of very low power consumption or generation.

INDUSTRIAL APPLICABILITY

The described system and principles are applicable to machines having electric motors and/or generators having stators requiring greater cooling than can be provided by traditional air-cooling. In such applications, electric motors may be used for implement actuation, material processing, motive force, and so on, and electric generators may be used for mechanical-to-electrical conversion in electric or hybrid machines, regenerative braking, resistive braking, and so on. Applicable environments include locomotive applications, industrial applications, transportation applications, and so on.

Within such applications, the described principles apply to the cooling of the stator or stator assembly of the electric motor/generator. The provided fluid cooling system uses certain end rings and spacers as described above to seal and isolates a cavity containing the stator from the rotating portions of the device, e.g., the stator, as well as from the external environment of the device. In this way, the cavity may be flooded with the cooling fluid, e.g., oil, without slowing or contaminating the rotor. When properly cooled in this manner, the motor/generator experiences enhanced protection against heat damage as well as enhanced efficiency and performance due to lower thermally induced electrical resistance.

Although the description focuses primarily on a traditional in-runner configuration wherein eth rotor runs within the stator, it will be appreciated that the described principles are also applicable to out runner applications, wherein the stator is located centrally and is surrounded by a hollow rotor assembly. In this scenario, the cavity containing the stator is cylindrical rather than annular, but the same use of spacers and end rings to seal the stator cavity will allow the motor/generator to run cooler and more efficiently. Moreover, although the cooling fluid described above by way of example is oil, it will be appreciated that other fluids may be used instead. Such other fluids include water, chemical coolants, and so on.

It will be appreciated that the foregoing description provides useful examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. For example, the illustrated calibration steps may optionally be executed in reverse order, and other alternative orders and steps may be practicable where logically appropriate without departing from the described principles.

We claim:

1. A liquid-cooled stator and rotor assembly for use as an electric motor or generator, the liquid-cooled stator and rotor assembly comprising:
   a housing having a first end bell, a second end bell, and at least one fluid orifice in the first end bell;
   a stator fixed within a stator cavity of the housing, the stator including a stator core and a plurality of windings for conducting a flow of electricity;
   a rotor for magnetically interacting with the stator, the rotor being rotatably mounted between the first end bell and the second end bell, and being positioned within a rotor cavity; and a first sealing ring adjacent the first end bell and a second sealing ring adjacent the second end bell, each sealing ring being adapted to form a fluid seal against the respective end bell and against a portion of the stator such that a cooling fluid entering the stator cavity via the at least one orifice does not substantially enter the rotor cavity.

2. The liquid-cooled stator and rotor assembly according to claim 1, further including a plurality of longitudinal spacers oriented axially with respect to the rotor and affixed to the stator core, so as to lay between the stator cavity and the rotor cavity.

3. The liquid-cooled stator and rotor assembly according to claim 2, wherein the first and second sealing rings further form a seal against two or more edges of each of the plurality of longitudinal spacers.

4. The liquid-cooled stator and rotor assembly according to claim 1, wherein the first and second sealing rings are formed of Nylon.

5. The liquid-cooled stator and rotor assembly according to claim 1, wherein the stator core includes a plurality of axially extending tongues, and wherein the first and second sealing rings form a seal against the stator core by engaging the plurality of axially extending tongues.

6. The liquid-cooled stator and rotor assembly according to claim 5, wherein each of the first and second sealing rings comprises a series of indentions for sealing against a matching series of the plurality of spacers.

7. The liquid-cooled stator and rotor assembly according to claim 6, wherein each of the first and second sealing rings further comprises an axially extending tongue underlying each of the series of indentions for further sealing against the matching series of the plurality of spacers.

8. The liquid-cooled stator and rotor assembly according to claim 1, wherein the cooling fluid is an oil.

9. The liquid-cooled stator and rotor assembly according to claim 1, wherein the stator core comprises a stator plenum for accepting the plurality of windings, such that a gap is provided between each stator winding and the stator core to allow passage of the cooling fluid.

10. An improved cooling electric motor comprising:
a motor housing;
a stator assembly within the motor housing, the stator assembly including a stator core and a plurality of windings;
a rotor assembly in a rotor cavity surrounded by the stator assembly;
first and second sealing rings, each sealing ring being positioned for sealing against the stator core and against the housing, thereby forming a stator cavity fluidly isolated from the rotor cavity; and
one or more orifices into the stator cavity for flooding the stator cavity with a cooling fluid.

11. The improved cooling electric motor according to claim 10, further including a plurality of longitudinal spacers oriented axially with respect to the rotor and affixed to the stator core, so as to lay between the stator cavity and the rotor cavity.

12. The improved cooling electric motor according to claim 11, wherein the first and second sealing rings further form a seal against two or more edges of each of the plurality of longitudinal spacers.

13. The improved cooling electric motor according to claim 10, wherein the stator core includes a plurality of axially extending tongues, and wherein the first and second sealing rings form a seal against the stator core by engaging the plurality of axially extending tongues.

14. The improved cooling electric motor according to claim 13, wherein each of the first and second sealing rings comprises a series of indentions for sealing against a matching series of the plurality of spacers.

15. The improved cooling electric motor according to claim 14, wherein each of the first and second sealing rings further comprises an axially extending tongue underlying each of the series of indentions for further sealing against the matching series of the plurality of spacers.

16. The improved cooling electric motor according to claim 10, wherein the cooling fluid is oil.

17. The improved cooling electric motor according to claim 10, wherein the stator core comprises a stator plenum for accepting the plurality of windings, such that a gap is provided between each stator winding and the stator core to allow passage of the cooling fluid.

* * * * *